US012475727B2

(12) United States Patent
Tageldin et al.

(10) Patent No.: US 12,475,727 B2
(45) Date of Patent: Nov. 18, 2025

(54) IMAGE-PROCESSING-BASED OBJECT CLASSIFICATION BOOTSTRAPPING OF REGION-LEVEL ANNOTATIONS

(71) Applicant: Ventana Medical Systems, Inc., Tucson, AZ (US)

(72) Inventors: Mohamed Amgad Tageldin, Tucson, AZ (US); Lee Alex Donald Cooper, Tucson, AZ (US); Jim F. Martin, Tucson, AZ (US); Uday Kukure, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 401 days.

(21) Appl. No.: 17/730,406

(22) Filed: Apr. 27, 2022

(65) Prior Publication Data
US 2022/0262145 A1  Aug. 18, 2022

Related U.S. Application Data

(63) Continuation of application No. PCT/US2020/056340, filed on Oct. 19, 2020.
(Continued)

(51) Int. Cl.
*G06V 20/69* (2022.01)
*G06T 7/00* (2017.01)
(Continued)

(52) U.S. Cl.
CPC .......... *G06V 20/698* (2022.01); *G06T 7/0014* (2013.01); *G06V 10/25* (2022.01);
(Continued)

(58) Field of Classification Search
CPC .. G06V 20/698; G06V 10/7747; G06V 10/82; G06V 10/764; G06V 10/25;
(Continued)

(56) References Cited

U.S. PATENT DOCUMENTS

| 11,556,746 B1* | 1/2023 | Dasgupta | G06N 20/00 |
| 2007/0009884 A1* | 1/2007 | Stoughton | B82Y 10/00 435/5 |

(Continued)

FOREIGN PATENT DOCUMENTS

| CN | 108805170 A | 11/2018 |
| CN | 109173263 A | 1/2019 |

(Continued)

OTHER PUBLICATIONS

Haridas et al., Interactive Segmentation Relabeling for Classification of Whole-Slide Histopathology Imagery, IEEE 28th International Symposium on Computer-Based Medical Systems, Jun. 22, 2015, pp. 84-87.
(Continued)

*Primary Examiner* — Qun Shen
(74) *Attorney, Agent, or Firm* — Kilpatrick Townsend & Stockton LLP

(57) ABSTRACT

Techniques relate to object classifications using bootstrapping of region-level annotations. For each of multiple images, regions within the image can be identified. For each region, a region-specific label can be identified, a set of objects within the region can be detected, and an object-specific label can be assigned to each object. The object-specific label can be the same as the region-specific label assigned to the region within which the object is located. A training data set can be defined to include, for each image of the multiple images, object-location data (indicating intra-image location data for the detected object) and label data (indicating the object-specific labels assigned to the objects). An image-processing model can be trained using the training data. Training can include learning values for a set of parameters that define calculations performed by the image-processing model.

20 Claims, 10 Drawing Sheets
(7 of 10 Drawing Sheet(s) Filed in Color)

Related U.S. Application Data

(60) Provisional application No. 62/929,100, filed on Oct. 31, 2019.

(51) Int. Cl.
| | | |
|---|---|---|
| *G06V 10/25* | (2022.01) | |
| *G06V 10/44* | (2022.01) | |
| *G06V 10/764* | (2022.01) | |
| *G06V 10/774* | (2022.01) | |
| *G06V 10/82* | (2022.01) | |

(52) U.S. Cl.
CPC .......... *G06V 10/454* (2022.01); *G06V 10/764* (2022.01); *G06V 10/7747* (2022.01); *G06V 10/82* (2022.01); *G06T 2207/20081* (2013.01); *G06T 2207/20084* (2013.01); *G06T 2207/30096* (2013.01); *G06V 2201/03* (2022.01)

(58) Field of Classification Search
CPC ................ G06V 10/454; G06T 7/0014; G06T 2207/20081; G06T 2207/20084; G06T 2207/30096
See application file for complete search history.

(56) References Cited

U.S. PATENT DOCUMENTS

| | | | | |
|---|---|---|---|---|
| 2007/0036402 A1* | 2/2007 | Cahill | .................... | G06T 7/0012 382/128 |
| 2009/0237501 A1* | 9/2009 | Lemmer | ............ | G02B 21/0076 348/79 |
| 2014/0375860 A1* | 12/2014 | Sato | .................... | H04N 23/635 348/333.01 |
| 2017/0169567 A1* | 6/2017 | Chefd'hotel | .......... | G06T 7/0012 |
| 2018/0107928 A1* | 4/2018 | Zhang | .................... | G06N 3/082 |
| 2018/0189951 A1 | 7/2018 | Liston et al. | | |
| 2018/0341811 A1* | 11/2018 | Bendale | .................. | G06V 20/70 |
| 2019/0095764 A1* | 3/2019 | Li | ..................... | G06F 18/24133 |
| 2019/0244347 A1* | 8/2019 | Buckler | ................. | G06V 10/25 |
| 2020/0193222 A1 | 6/2020 | Singh et al. | | |
| 2020/0342597 A1* | 10/2020 | Chukka | ............... | G06V 20/698 |
| 2021/0034865 A1* | 2/2021 | Nord | ...................... | G06F 18/254 |
| 2021/0124920 A1* | 4/2021 | Stahlfeld | ................. | G06F 17/15 |

FOREIGN PATENT DOCUMENTS

| | | |
|---|---|---|
| JP | 2021506022 A | 2/2021 |
| WO | 2015177268 A1 | 11/2015 |
| WO | 2019110583 A1 | 6/2019 |

OTHER PUBLICATIONS

International Application No. PCT/US2020/056340, International Preliminary Report on Patentability mailed on May 12, 2022, 10 pages.

International Application No. PCT/US2020/056340, International Search Report and Written Opinion mailed on Feb. 8, 2021, 14 pages.

Xing et al., Robust Nucleus/Cell Detection and Segmentation in Digital Pathology and Microscopy Images: A Comprehensive Review, Institute of Electrical and Electronics Engineers Reviews in Biomedical Engineering, vol. 9, Jan. 2016, pp. 234-263.

EP Application No. 20807184.5 , "Office Action", May 2, 2024, 5 pages.

JP Application No. 2022-524926 , "Office Action", Aug. 13, 2024, 4 pages.

JP Application No. 2022-524926 , "Notice of Decision to Grant", Jan. 7, 2025, 6 pages.

CN Application No. 202080090113.9, "Office Action", May 15, 2025, 28 pages.

* cited by examiner

Initial Model-Output
Object-Specific Labels

Region-Specific Labels

Enhanced Object-Specific
Labels using Region Priors

IMAGE-PROCESSING-BASED OBJECT CLASSIFICATION BOOTSTRAPPING OF REGION-LEVEL ANNOTATIONS

CROSS-REFERENCE TO RELATED APPLICATIONS

This application claims the benefit of and priority to PCT Application Number PCT/US2020/056340, filed on Oct. 19, 2020, which claims the benefit of and priority to U.S. Provisional Application No. 62/929,100, filed on Oct. 31, 2019. Each of these applications is hereby incorporated by reference in its entirety for all purposes.

BACKGROUND

Frequently, images are processed to detect distinct objects within each image and classify each of the distinct objects. This processing can involve manual effort and/or automated approaches. One exemplary use case is in a biological context, in which histology images are processed to identify individual cells and to identify a cell type for each cell. To manually complete this processing can amount to a substantial time and financial expense, particularly when many images are being reviewed (as they often are). For example, whole-slide histology images can be very large in size and include depictions of tens of thousands of cells. Further, this labeling can require heavy domain expertise.

One approach to expedite this process is to use an automated technique to process the images. For example, a deep-learning model can be used to assign labels to individual objects within the images (e.g., individual cells). However, the sensitivity and specificity of this approach can be strongly impacted by the size of a training data set. The training data typically includes annotated images (that identify objects' locations within an image and object-specific classifications), which have traditionally been generated as a result of manual assessment of images.

Given that the manual assessment has the above-noted substantial time and financial expenses, securing large training sets can be costly and/or difficult. Consequently, it can be difficult to train an image-processing model (eg., deep learning model) to perform these tasks accurately.

SUMMARY

In some embodiments, a bootstrapping technique is used to process images for object detection and classification. More specifically, each image of one or more images may be processed to initially identify higher level regions within the image and to associate each higher level region with a region-specific label. For example, a higher level region may be defined to correspond to a portion of the image defined by a user-input outline, and the region-specific label can include a cell type indicated by user input. Lower level objects within the region can then be detected (e.g., using an edge-detection technique, contrast analysis, intensity analysis, color analysis, etc.). A lower level object can include (or be) an individual cell or cell nucleus.

Each of the lower level objects can be assigned an object-specific label that is the same as the region-specific label assigned to a higher level region within which the lower level object is located. An image-processing model (e.g., a machine-learning model, such as a deep neural network and/or convolutional neural network) can then be trained. Post-processing can include identifying a subset of the automatically detected objects for manual review of the associated object-specific labels. For example, one or more presentations can be generated and output that include part or all of an image along with an identification of the subset of objects and their assigned object-specific labels. Any input that is received can be used as an indication as to whether the object-specific labels are accurate (or whether other labels correspond to the identified objects). This feedback can be used to retrain the image-processing model. Thus, the image-processing model can be trained to possess high specificity and sensitivity while requiring relatively little input indicative of manual review.

In some embodiments, a computer-implemented method is provided. For each image of the set of images, multiple regions within the image can be identified. For each region of the multiple regions, a region-specific label can be identified for the region, a set of objects within the region can be detected, and an object-specific label can be assigned to each object of the set of objects. The object-specific label can be the same as the region-specific label assigned to the region within which the object is located. A training data set can be defined to include, for each image of the set of images object-location data (indicating, for each object of the detected set of objects, intra-image location data for the object) and label data (indicating, for each object of the detected set of objects, the object-specific label assigned to the object. An image-processing model can be trained using the training data. The training can include learning a set of parameter values for a set of parameters that define calculations performed by the image-processing model.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Image-Processing Interaction System

Figure 1:
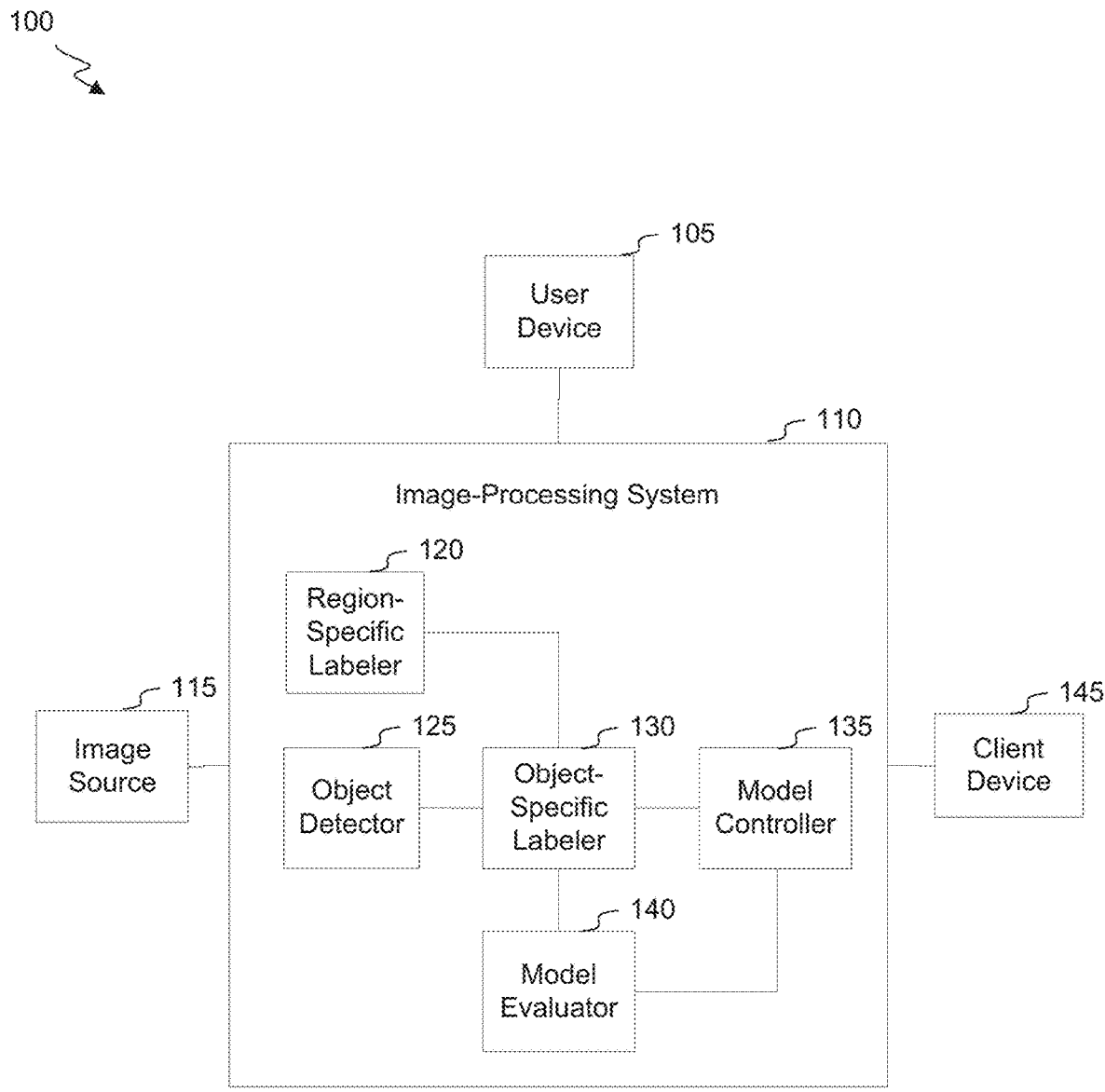
FIG. 1 shows an image-processing interaction system that includes multiple devices/systems configured to support inter-device communication and image processing.

FIG. 1 shows an image-processing interaction system 100 that includes multiple devices/systems configured to support inter-device communication and image processing. A user device 105 can send an image-processing request to an image-processing system 110. The image-processing request may be transmitted via an interface, such as an online interface. The image-processing request can identify one or more images to be processed. For example, the image-processing request can include an identifier (e.g., of a subject and/or sample) that can be used to retrieve the image(s) from an image source 115. Image-processing system 110 can then send a request for the image(s) that includes the identifier and authorizing data to image source 115, which can return the image(s). As another example, the image-processing request can include or otherwise be associated with the image(s), which may have been uploaded at client device 105.

The images can include histology images, such as H&E images that depict a sample stained with H&E stains. The images may include another immunohistochemistry (IHC) image (which by definition uses a type of stain other than H&E). A single sample may be associated with corresponding H&E and IHC images. The H&E and IHC images are to be co-registered (using a rigid or deformable image-registration). The H&E images and IHC images may then be used for different assessments (e.g., where H&E images are used to detect regions and IHC images are used to identify object information for labeling). The images may include bright-field images, non-brightfield images (e.g., electron microscopy images), and/or scanned whole-slide histology images.

Image-processing system 110 can include a region-specific labeler that processes each image to identify one or more regions within the image. Each region can correspond to a histologic region and can correspond to (for example) a tumor region, stroma region or lymphocytic-infiltrate region. Each region can correspond to (for example) an area in which cells within the region predominately and substantially have similar visual characteristics (e.g., in terms of size, shape, intensity and/or color). A label for each region can indicate (for example) a biological structure that corresponds to the region and/or a prominent cell type of the region.

Region-specific labeler 120 can define and/or label each region automatically, semi-automatically or based on user input. For example, a graphical user interface can be availed to user device 105. The graphical user interface can present part or all of an image and can include a tool that can be used to identify a border of an individual region (e.g., a lasso tool, pencil tool, box-selection tool, oval-selection tool, etc.). The interface can further accept input received at user device 105 that identifies a label for the region. The input may be accepted at a window or pop-up component of the interface, which can include a text box to accept a free-form label for a region or a selection component to accept a selection of a label from among a set of potential labels. The selection component can include a drop-down menu or multiple selectable radio buttons.

As another example, an automated or semi-automated approach can process the image to detect prominent edges, and regions may be identified and/or proposed (e.g., via a representation in an interface) accordingly. The automated or semi-automated approach may further or alternatively identify image metrics (e.g., intensity, hue and/or contrast) for each of a set of patches within the image. Individual regions may be defined to correspond to sets of image patches that have similar image metrics.

An object detector 125 can detect objects within an image. Each of the detected objects can include (or be) a biological structure, such as a cell or a cell nucleus. The object can be detected automatically using imagine processing. Image processing can include using connected component analysis, edge detection, color (or transformed-color) channel-specific analyses, smoothing algorithms, thresholding algorithms, etc. For example, image processing can include performing stain "unmixing" using established methods like Macenko's Principle Component Analysis (PCA) based method or methods that rely on Sparse Non-negative Matrix Factorization (SNMF), among others. For each region label, a region prior (e.g., binary region prior) can then be transformed using (e.g., multiplied by) a stain channel (e.g., hematoxylin channel). One or more smoothing and/or thresholding processes can be performed to obtain nuclear boundaries (e.g., by iteratively applying Gaussian smoothing and Otsu thresholding). A connected component analysis can then be performed to isolate nuclei objects.

An object-specific labeler 130 can assign an object-specific label to each detected object. Initially, each object-specific label may be defined to be equal to the label associated with the corresponding region. Object-specific labeler 130 can identify an incomplete subset of the set of objects, for which each object in the incomplete subset is to be reassigned or to assigned to a non-cell label. The non-cell label can indicate that it is predicted that the object is not and/or does not correspond to a cell. The incomplete subset of objects can include (for example) objects having an area that is below and/or above a corresponding pre-defined threshold area and/or having an aspect ratio, circularity and/or area that does not correspond to a baseline instance.

A model controller 135 can then train a machine-learning model using the object-specific labels. The machine-learning model can include (for example) a deep neural network, recurrent neural network and/or convolutional neural network. The training may use overlapping tiles or patches and/or restricting model predictions to a center or middle of each tile or patch, which may reduce an effect of edge artifacts. In some instances, post-processing can (but need not) be defined and/or trained using the object-specific labels. The post processing can use binary erosion, binary dilatation, Gaussian smoothing or another technique to inhibit segmentation artifacts.

After the machine-learning model (e.g., and a post-processing technique) is trained, model controller 135 can use the model to process image data corresponding to the same image(s) used to train the model and/or a different image. The image data can include part or all of the image(s) and object-specific data that identifies which portions of the image(s) correspond to distinct objects. An output of the machine-learning model (and/or a post-processing) can include an object-specific label for each detected object. It will be appreciated that the object-specific labels generated using the trained model can differ from the object-specific labels assigned initially based on region-specific labels.

Object-specific labeler 130 can modify select labels. A population-based approach can be used to identify select objects that are associated with uncommon (e.g., having a prevalence below a predefined threshold) size, shape, intensity profile, contrast profile and/or color profile. For each of these select objects, a label assignment may be modified and/or a new label may be defined. For example, an uncommon shape of an object may be representative of a cell undergoing necrosis. Thus, the shape itself is not necessarily indicative of a cell type, but perhaps a physiological stage. As another example, a rarity of a given label in a particular context (e.g., vascular endothelial cells in images corresponding to breast cancer) may trigger reassignment of the label. A newly assigned label may include one that indicates that the label is not to be used while training a model to classify objects.

A model evaluator 140 may select objects to be reviewed. The objects can be selected based on (for example) confidence metrics associated with label assignments. A confidence metric can indicate a degree to which one or more characteristics of an object (e.g., a size, shape, intensity profile, contrast profile and/or color profile) correspond to or match one or more characteristics of an object type associated with the assigned label. The trained machine-learning model may output a confidence metric in association with each label output (corresponding to an individual output). Objects selected for review can include some or all objects associated with a confidence metric that is below an absolute threshold or relative threshold (e.g., within a lowest 5% of confidence metrics across a set of objects).

Model evaluator 140 may further or alternatively select objects for review by using a pseudorandom selection technique and/or targeted selection technique. For example, a predefined rule may indicate that a particular number of objects are to be selected for review and/or may identify an upper limit and/or a lower limit for a number of objects to be identified for review. A targeted selection technique may be configured to bias object selections towards and/or to constrain object selections to objects having particular characteristics.

A selection of objects for review may relate to, affect and/or depend on a selection of one or more images (e.g., corresponding to different fields of view). In an instance in which a machine-learning model processes multiple images to detect and label objects, a review need not include all of the multiple images. Rather, a subset of images (e.g., a single image) may be selected. Each of the subset of images may be selected to have a representative field of view of a slide that is representative of at least a threshold number of, at least a threshold percentage of object-specific labels and/or region-specific labels. Alternatively, each of the subset of images may be selected based on which objects were flagged for review. For example, the subset can include an image that has a high number or density (e.g., that is above a predefined threshold and/or relative to other images) of objects flagged for review. As another example, the subset may be selected such that each of multiple object-specific labels are associated with an object represented in an image of the subset. To achieve this representation, for each of the object-specific labels, it may be determined which image(s) have an object with the label, and a single image may then be selected (e.g., using a pseudorandom selection technique). A density and/or variability of objects can also be used to enhance stratified sampling of images for review. As yet another example, the subset can be selected to provide a large-scale review of hot spots or representative foci of objects flagged for review.

Upon identifying select objects and/or regions for review, model evaluator 140 can generate and transmit a communication to user device 105 (or to another user device). Receipt of the communication can trigger a presentation of an interface that includes a selected images, one or more selected objects and one or more object-specific labels associated with the selected object(s). The interface may further identify boundaries of one or more regions and region-specific label(s). For example, for each of the selected objects and/or regions, a border or boundary that defines an area of the object or region may be overlaid on the image. The associated label may be depicted within the area or presented subsequent to a mouse-over or click on the area.

The interface can include input components that can detect input identifying a modification to or replacement for a boundary and/or label. For example, a pencil tool or ellipse tool may be used to redefine or modify a boundary and/or a text tool (or a radio-button tool or dropdown tool) can be used to identify a label. The interface may further include a tool that can be used to indicate whether an identified boundary or label is accepted as being appropriate.

User device 105 can transmit communications to image-processing system 110 (to be routed to model evaluator 140) that represent inputs received at the interface.

Model evaluator 140 can generate one or more evaluation-quality metrics that represent an inferred quality of the review. The metric(s) may be generated based on which user is associated with user device 105 (e.g., number of reviews performed by the user before, stored credentials associated with the user, etc.), number of reviews performed at user device 105 previously, degree to which a proportion or quantity of modified or replaced labels or boundaries corresponds to a typical proportion or quantity (e.g., for a given field of view, type of slide, classifier confidence or other heuristic), amount of time during which the interface was presented and/or during which input activity was detected, absolute number of modifications or replacements made, and/or degree to which an actual number of corrections matched an expected number of corrections (e.g., given a type of field of view, type of slide, classifier confidence, etc.).

Evaluation-quality metrics can include metrics that apply to a review in its entirety and/or to a reviewer in general. Alternatively or additionally, evaluation-quality metrics can be generated that apply to a more specific part of a review and/or the correspond to more than one review and/or more than one reviewer. For example, an evaluation-quality metric can be generated for a given field of view. The metric may be determined based on (for example)

- An extent of concordance (e.g., in terms of a quantity of corrections made or particular corrections made) between reviews generated by multiple reviewers and/or by a subject matter expert (e.g., senior pathologist) over a common set of images corresponding to a given field of view;
- An extent of concordance between reviews generated by a same reviewer at multiple time periods;
- A degree of disparity between reviews (e.g., in terms of same field of view) when initial bootstrapped cells are displayed versus when the cells are displayed with model-generated labels; and/or
- A degree of disparity between reviews for a same field of view when labels are provided by a reviewer from scratch ("de novo") versus when the reviewer(s) correct model-generated labels.

Model controller 135 can then retrain the machine-learning model using any modified or new labels or boundaries. The retraining can include reinforcement training. In instances in which one or more evaluation-quality metrics are generated, the retraining may be performed using the metrics. For example, a training data set can be defined to include multiple images, reviewed annotations, and image-associated weights that are defined based on the evaluation-quality metric(s) associated with individual images. Training may be performed via a single stage of training or multiple stages. For example, a multi-step training can begin by performing large-scale training using the review data to provide model initialization. This large-scale training can be particularly advantageous when the machine-learning model includes a deep-learning model (e.g., mask recurrent convolutional neural network). Training can then continue to use high-quality images that have been closely inspected (e.g., during a review or by a reviewer associated with a high evaluation-quality metric.

Model controller 135 can then avail the retrained machine-learning model to process new images. The new images may be provided by a different or same entity as compared to an entity that provided initial images and/or as compared to a reviewer. For example, model controller 135 may determine that a client device 145 is authorized to use the retrained machine-learning model. Availing the machine-learning model can include unlocking functionality of software to be operated locally at client device 145 and/or responding to requests to process images using the model (e.g., by performing automated labeling) online. The retrained machine-learning model can then be used to generate accurate object-level annotations without relying upon heuristics and/or subject-matter expertise.

It will be appreciated that image-processing system 110 may operate so as to produce a highly accurate cell-localization and/or segmentation model. To enhance an accuracy of the model, multiple reviews of model-generated metrics can be performed, qualities of the reviews can be assessed, and the model can be repeatedly retrained based on the reviews and quality assessment. Undergoing a high number of reviews, assessment of the reviews and retrainings can be a time-intensive effort. Thus, this process may result in moderate throughput for the system. Alternatively, image-processing system 110 may operate so as to produce a high-throuhput system by implementing a rapid prototyping framework. The framework can have a reduced emphasis on user input and/or reviews. For example, the framework can include using a simple heuristic-based algorithmic segmentation, training the machine-learning model using boot-strapped object annotations and possibly facilitating high-level review of prominent labeling errors or inconsistencies.

Figure 2:
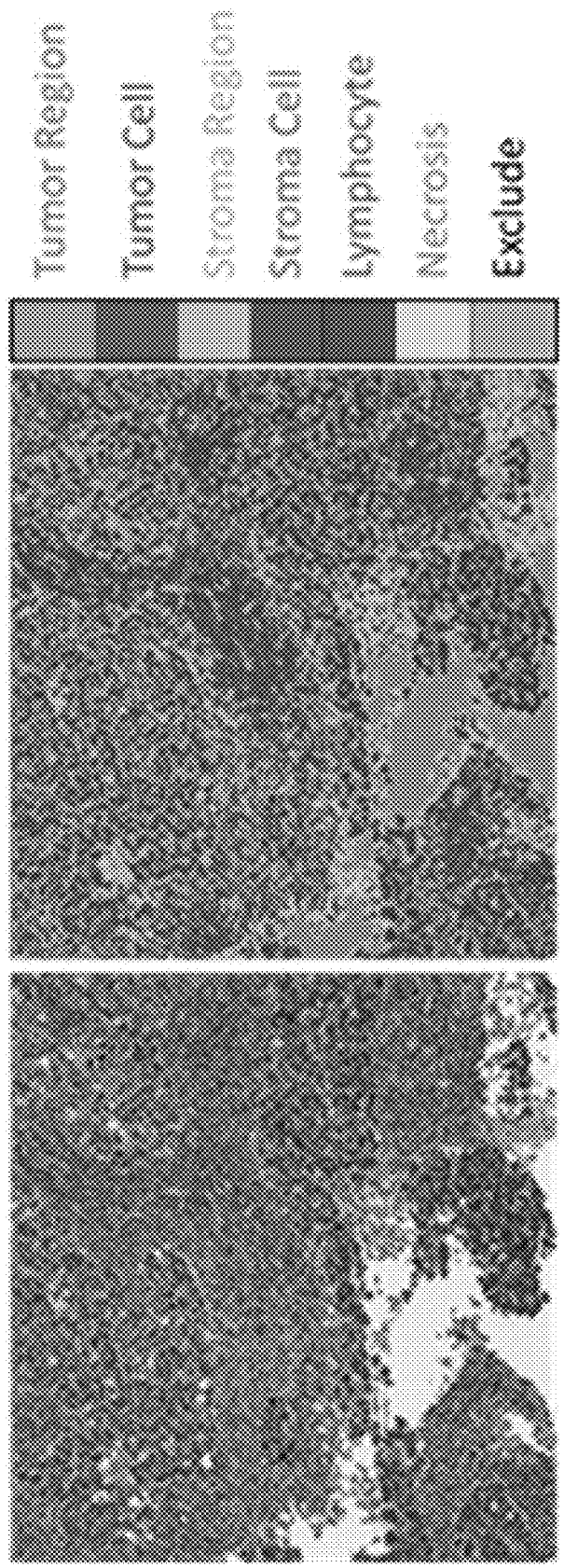
FIG. 2 illustrates how individual regions within images can encompass multiple object types.

II. Accuracy and Efficiency Advantages of Bootstrapping Machine-Learning Technique Traditional histology image processing has been highly reliant upon manual input from users that identify annotations or regions and cells. Due in part to the scale of the images, annotating cells is a highly time-intensive endeavor. Further, while regions are typically predominated by a single cell type, a region often includes a substantial number of cells of other types. (See FIG. 2, which shows different regions and cell classes in an image of a breast cancer slide.) Further, due to the variability of appearances of cells of a given type, expertise required for cell annotating is high.

In order of financial expense, time expense and complexity of logistics, annotation types can be ordered as follows (from easiest to most difficult):

1. Image-level classification (e.g. labeling a slide as "infiltrating ductal breast cancer")
2. Region-level classification (e.g. labeling a tissue region as "mostly containing lymphocytes")
3. Object centroid localization (e.g. placing seeds on lymphocyte cells)
4. Bounding box localization (e.g. placing a box around lymphocyte cells)
5. Object segmentation (e.g. drawing a polygon around lymphocyte cell The bootstrapping technique provided herein, in which a machine-learning model is trained based on cell labels initially defined for corresponding regions, thus can greatly improve annotation efficiency. An annotator need not commit time to labeling individual cells. Rather, by focusing annotation efforts on higher-level regions, efficiency can be improved. Further, select and strategic reviews and retraining can facilitate a high level of accuracy.

III. Process for Bootstrapping Machine-Learning Technique

Figure 3:
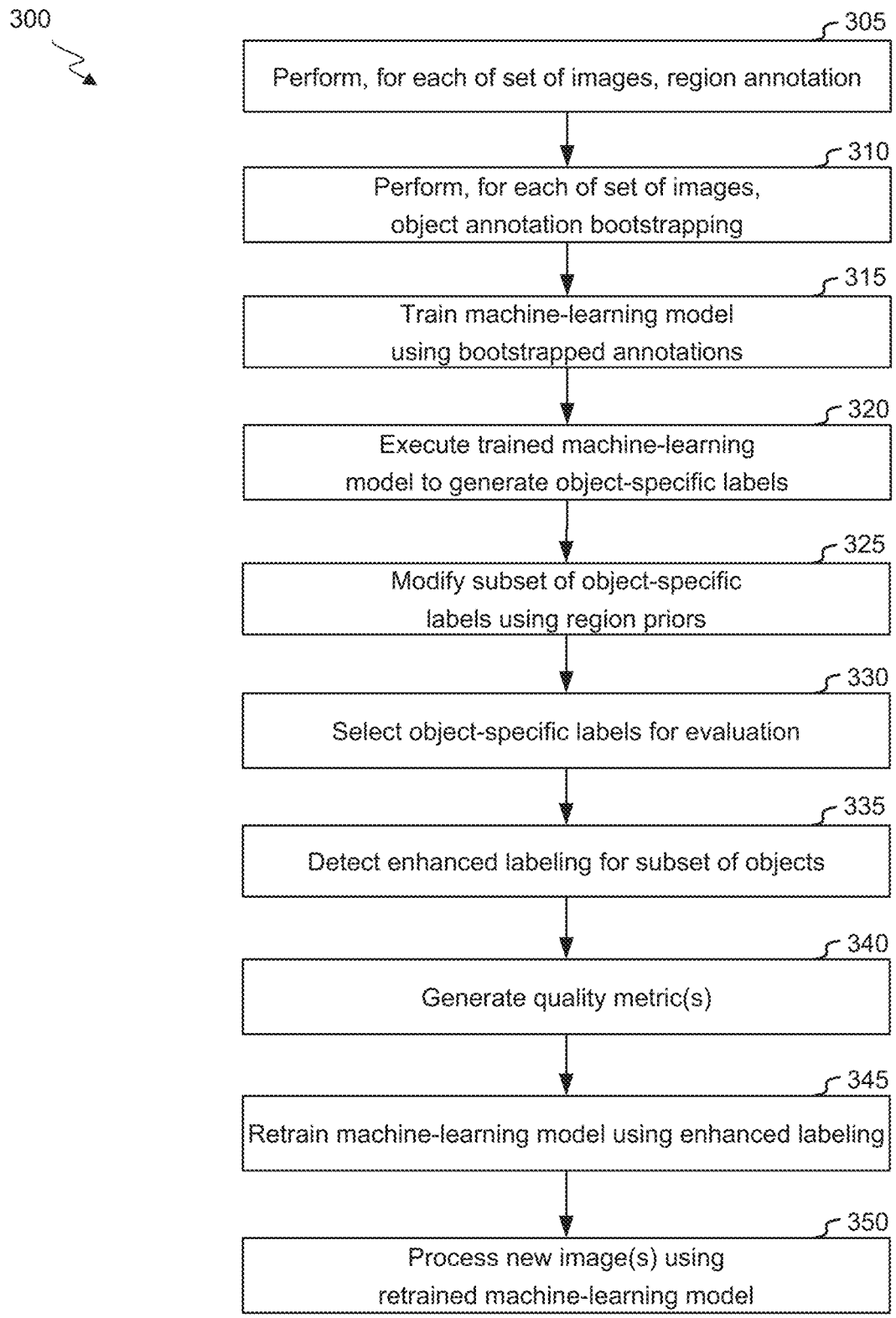
FIG. 3 shows a process 300 for generating and training a machine-learning model to detect and label objects within an image.

FIG. 3 shows a process 300 for generating and training a machine-learning model to detect and label objects within an image. Process 300 begins at block 305 where region annotation is performed for each of a set of images. Each of the set of images may correspond to field of view of a histology slide. The fields of view may partly overlap with each other across an image set.

The region annotation can include identifying, for each of one or more regions, a boundary (or other spatial characteristic) of the region within the image. The region annotation may be performed based on user input, semi-automatically using a computer-vision technique or automatically using a computer-vision technique. The region annotation can further include identifying a region-specific label for each region. The region-specific label can correspond to a particular cell type and/or characterization of a biological structure. For example, a region-specific label can include "tumor" or "tumor cells". In instances in which the region annotation is performed using user input, the region-specific label may be identified by a user by inputting free text or selecting from a set of predefined label options.

While not shown in FIG. 3, object detection can be performed prior to or after block 305. Object detection can be performed automatically using a computer-vision technique. The objects being detected can include biological cells and possibly other biological structures.

At block 310, for each image of the set of images, object-annotation bootstrapping is performed. The bootstrapping can include assigning, for each of at least some of the objects, a label corresponding to the region within which the object resides. In some instances, bootstrapping may be selectively performed for objects having spatial characteristics that correspond to cell spatial characteristics (e.g., having an area, contrast and/or aspect ratio that corresponds to a comparable statistical profile of cells given a field of view of the image). Further, bootstrapping need not be performed for objects that are not within any defined region.

At block 315, a machine-learning model is trained using a training data set that includes the bootstrapped annotations. Input to the machine-learning model can include one or more images and object data, such as a center position of each detected object and/or a boundary of each detected object. In some instances, pre-processing can be performed to filter out a subset of the set of objects based on spatial characteristics of the object (e.g., to filter out objects having a shape not typical of a cell and/or being close to an edge of an image and/or to an edge of a region). Output of the machine-learning model can include a label for each identified object and potentially a confidence metric associated with the label. The machine-learning model can include a neural network, convolutional neural network, recurrent neural network and/or deep neural network. Training the model can include learning parameter values that define how input data is transformed into output data.

At block 320, the trained machine-learning model is executed to generate object-specific labels. The object-specific labels generated at block 320 may be generated by processing images that were in the training data set or by processing other images.

At block 325, a subset of the object-specific labels generated at block 320 are modified using region priors. More specifically, the trained machine-learning model may have predicted that multiple objects correspond to an object-specific label that differs from a region-specific label of a region within which the object is located in the image. For some of these instances, the object-specific label may be defined (at block 325) to be the same as the region-specific label despite the model's contrary prediction. The region-prior label may be assigned when (for example) an object has an atypical spatial characteristic (e.g., heterogeneous and/or substantially asymmetrical across axes) and/or when an object type associated with a model-predicted label is unlikely to exist within a context of a slide associated with the image. For example, it may be unlikely to observe vascular endothelial cells in a slide associated with a breast-cancer sample.

At block 330, multiple object-specific labels are selected for evaluation. The object-specific labels selected for evaluation can be fewer in number than those defined for a given slide, field of view, image or data set. The selection may be made based on confidence metrics and/or a sample-selection technique (e.g., a pseudo-random selection technique). Information pertaining to the object-specific labels and/or associated objects can be availed to a reviewer. For example, an interface may be generated that includes an image and that identifies locations of objects associated with the multiple object-specific labels (e.g., by including a mark on a nucleus of a cell object and/or by including an outline of an object).

At block 335, enhanced labeling for a subset of the objects is detected. The subset of objects may correspond to some or all of the multiple object-specific labels selected for evaluation. The enhanced labeling can include labels that differ from object-specific labels generated by the machine-learning model and/or labels that are the same as object-specific labels generated by the machine-learning model. For example, an interface availed to a reviewer can be configured to receive input that identifies an object-specific label for the object. The object-specific label can be identified explicitly (e.g., by receiving an express label identification, which may differ from or be the same as a label generated by the machine-learning model) or implicitly (e.g., by inferring that a presented object-specific label generated by the machine-learning model is correct if no contrary label is provided). The reviewer-identified (and/or reviewer approved) object-specific labels can be tagged as enhanced labels.

At block 340, quality metrics can be generated for the enhanced labeling. Quality metrics may be generated based on a tracked experience of a reviewer, length of time during which a reviewing interface was presented, a percentage of label modifications identified, a consistency (e.g., across users and/or for a same user) in labels identified across multiple presentations of the same data, a correlation between a likelihood that a label was corrected and model-output confidence scores, etc. A quality metric may be assigned for a given data set, slide, image, reviewer, image type, and/or field of view.

At block 345, the machine-learning model is retrained using the enhanced labeling. In some instances, the quality metrics are used to weight portions of enhanced labeling in the retraining. For example, enhanced labeling from one reviewer and/or associated with one field of view may be more highly weighted relative to enhanced labeling from another reviewer and/or associated with another field of view.

At block 350, new images are processed using the retrained machine-learning model. In some instances, no region annotation is performed prior to processing the new images. In some instances, region annotation is performed as a pre-processing. Post-processing may also be performed (e.g., to modify a subset of object-specific labels using region priors as described herein). An output may be transmitted to and/or presented at a user device. The output can include one or more images; indications as to where, within the image(s), the objects are located and the label of each object. The output can additionally or alternatively include higher level information, such as a list of object-specific labels detected within a data set, a quantity of objects associated with each of the object-specific labels and/or spatial distribution information corresponding to each of the object-specific labels.

IV. Examples

The following examples relate to using various image-processing techniques (including the bootstrapping technique disclosed herein) to generate object-specific labels. More specifically, 125 images were obtained from the TCGA data set. Each of the images depicts a field of view of an H&E stained diagnostic breast cancer slide.

IV.A. Region Annotation

Figure 4A:
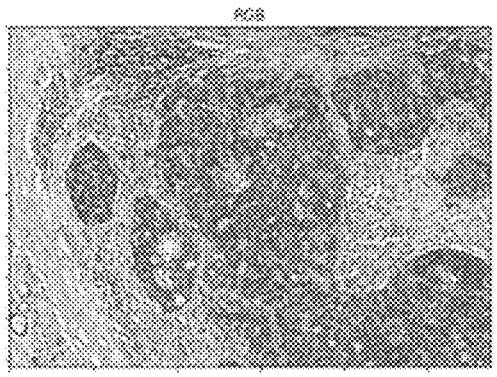
FIGS. 4A-4E show images pertaining to region annotation.
Figure 4B:
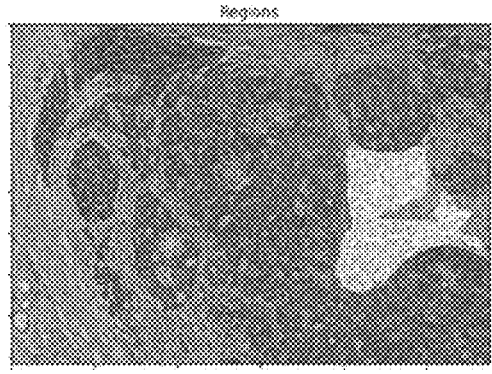

FIGS. 4A-4E show images pertaining to region annotation. FIG. 4A shows an original RGB image from the TCGA data set. A trained user then manually identified boundaries for various histologic regions in the image. The user also identified a region-specific label for each region. FIG. 4B shows a processed version of the original RGB image, in which pixels are colored so as to indicate a region-specific label for a corresponding region in which the pixel is located.

Figure 4C:
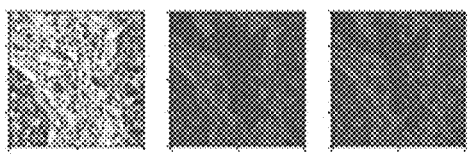
Figure 4D:
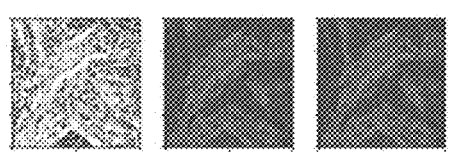

In some instances, a smoothing can be applied to manual region annotations. The left-most images in FIGS. 4C and 4D also show an original RGB image from the TCGA data set, and the right-most images from FIGS. 4C and 4D show the histologic regions identified by user input. The middle images in FIGS. 4C and 4D show results of applying fully-connected conditional random fields smoothing to enhance correspondence between manual annotations and tissue boundaries.

Figure 4E:
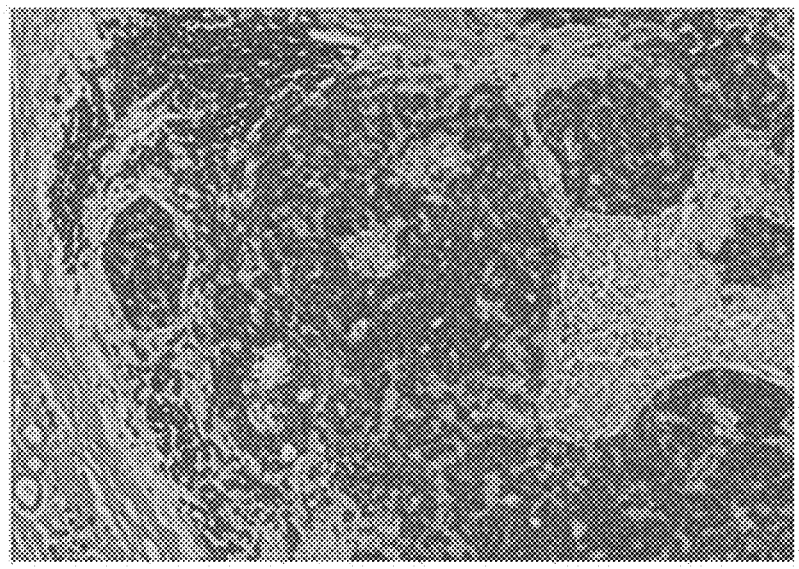

FIG. 4E shows a processed version of the image from FIG. 4B. In this instances, the image of FIG. 4B was processed by color thresholding the image in HSV space and then applying a Gaussian smoothing and otsu thresholding.

Thus, FIG. 4 shows a variety of techniques by which regions can be defined (e.g., based purely on manual input, by applying random fields smoothing to manually annotated inputs, by applying another type of smoothing (e.g., Gaussian smoothing) and/or by applying one or more thresholding.

Figure 5A:
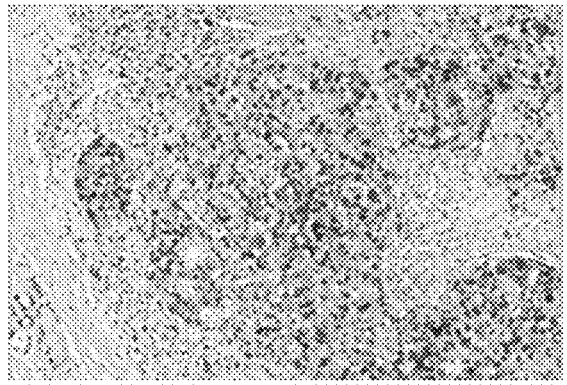
FIGS. 5A-5F illustrate results of applying non-machine-learning models and image processing heuristics to produce bootstrapped, noisy nucleus annotations from region annotations.

IV.B. Applying Non-Machine-Learning Models and Image-Processing Heuristics to Generate Bootstrapped Nucleus Annotations from Region Annotations FIGS. 5A-5F illustrate results of applying non-machine-learning models and image processing heuristics to produce bootstrapped, noisy nucleus annotations from region annotations. Notably, the thresholding and Gaussian smoothing performed to generate the image in FIG. 5 resulted in regions that were less contiguous than those of FIGS. 4B, 4C and 4D, which may indicate that the technique better detects non-homogeneous cell types within a region. The RGB image of FIG. 4A was processed using computer-vision techniques to detect individual cells. Each of the detected cells was initially assigned an object-specific label that matched a region-specific label for a region of the pixel. FIG. 5A depicts the image with color shading indicating the object-specific label assigned based on region-specific labels depicted in FIG. 4E. Red shades represent tumor labels, blue shades represent lymphocyte labels, green shades represent fibroblast labels, orange shades represent necrosis labels, and grey shades represent an "other" label. As shown, many cells within stromal regions have been classified as fibroblasts. This represents an inconsistency between the labels. The cells likely should be assigned a lymphocyte label.

Figure 5B:
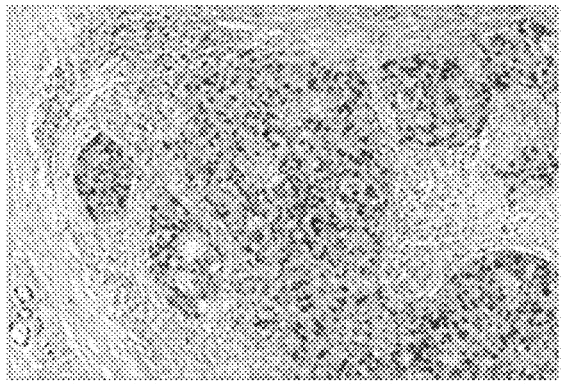

Heuristic-based approaches were applied to modify label assignments. More specifically, shape and size constraints were applies to identify objects for which initial label assignments were to be removed. FIG. 5B shows the object-specific label assignments after the heuristic-based processing. Notably, the label modifications affected many of the objects initially identified as lymphocytes that were within stromal regions.

Figure 5C:
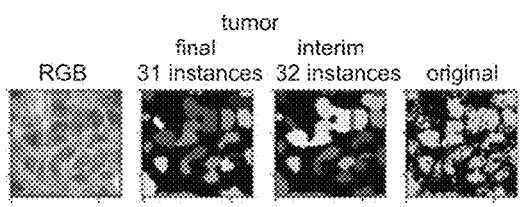
Figure 5D:
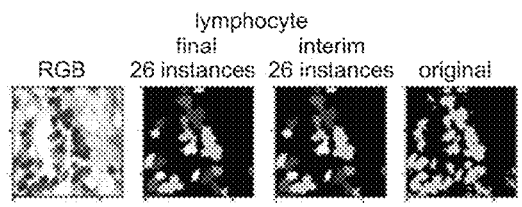
Figure 5E:
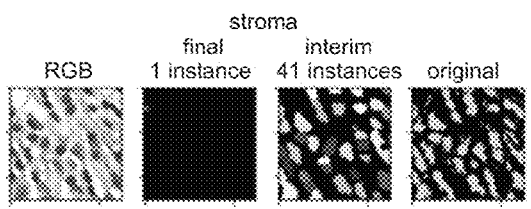
Figure 5F:
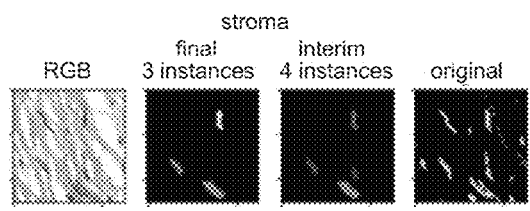

Each of FIGS. 5C-5F show how initial RGB images (left-most images) were assigned initial labels based on a bootstrapping technique. In FIGS. 5C and 5D, the bootstrapping technique results in correctly classifying the majority of nuclei. (Compare the second-to-the-right "Interim" image with the second-to-the-left "Final" image.) Meanwhile, in FIGS. 5E and 5F, the bootstrapping technique resulted in assigning incorrect labels to nuclei. FIG. 5E depicts a stromal region with lymphocyte cells, and FIG. 5F depicts a stromal region with fibroblast cells. FIG. 5E depicts an instance in which lymphocytes receive an incorrect label of "fibroblasts" before applying heuristics to modify initial labels.

Figure 6A:
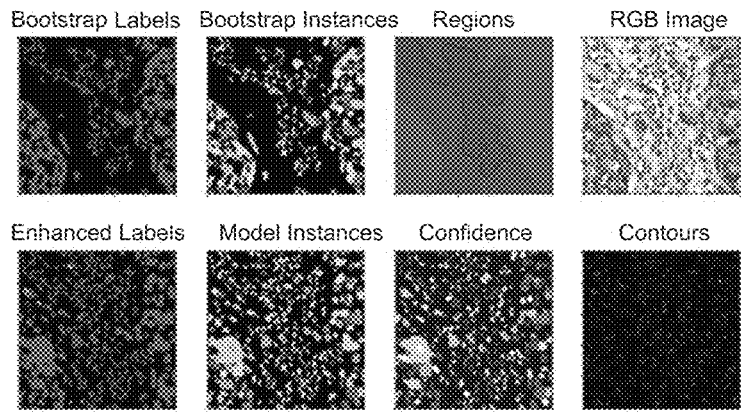
FIGS. 6A-6C show objects labels generated by a model trained with bootstrapped annotations for three histology images.
Figure 6B:
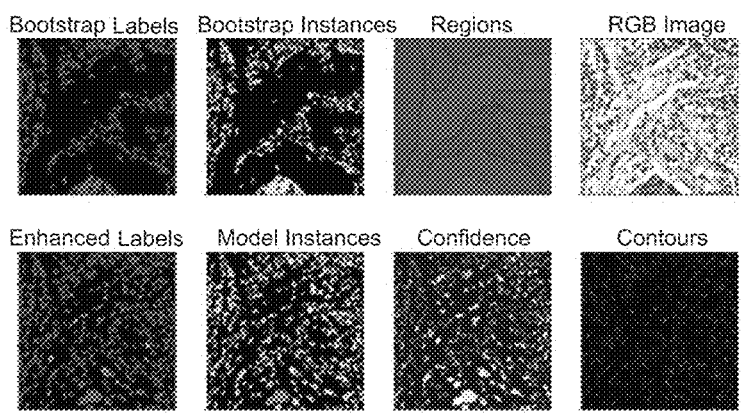
Figure 6C:
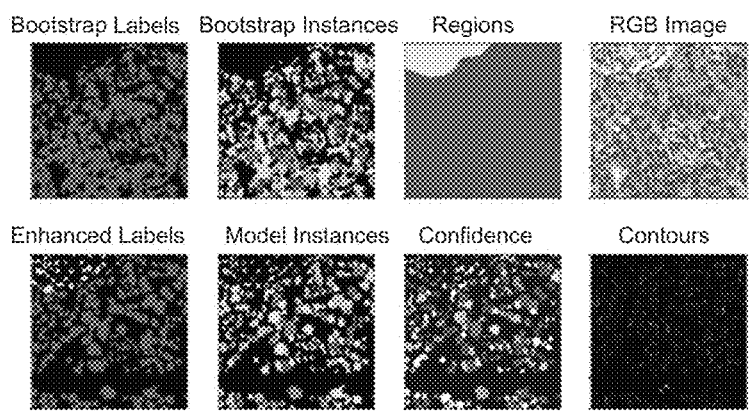

IV.C. Predictions from Trained Machine-Learning Model Using Bootstrapped Annotations FIGS. 6A-6C show objects labels generated by a model trained with bootstrapped annotations for three histology images. In each of FIGS. 6A-6C, the top row shows the original images (right-most image), region annotations (second-to-right image) and noisy bootstrapped nuclei (left-most image), and the bottom row shows predictions from a mask-rcnn model trained using a training data set with bootstrapped-labeled information. Notably, mask-rcnn predictions are more extensive (not conforming to imprecise region annotation boundaries). Further, mask-rcnn predictions are more "round" and conform much better to nucleus contours. Additionally, nuclei that are not predominant in a region get correctly classified in mask-rcnn output even though bootstrapped labels (used to train the model) were incorrect. This is most pronounced for lymphocytes in stromal (A, B) and tumor (C) regions.

IV.D. Using Region Priors to Modify Labels from Machine-Learning Model

Figure 7A:
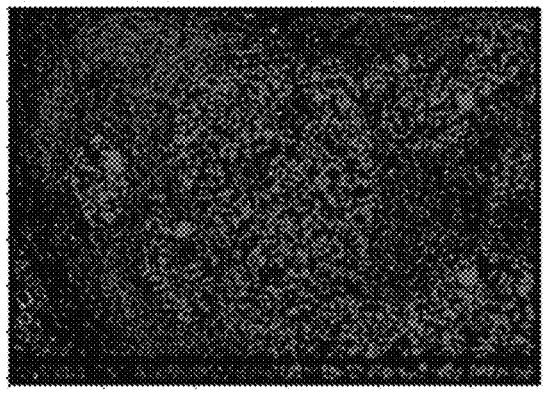
FIGS. 7A-7C show object-specific and region-specific labels for a histology image.

FIG. 7A shows labels generated for an image by a mask recurrent convolutional neural network after the network had been initially trained with the bootstrapped cell-specific labels. The model was trained to select one of the following labels for each cell: tumor, fibroblast, lymphocyte, plasma cell nuclei, inflammatory infiltrate and other nuclei.

Figure 7B:
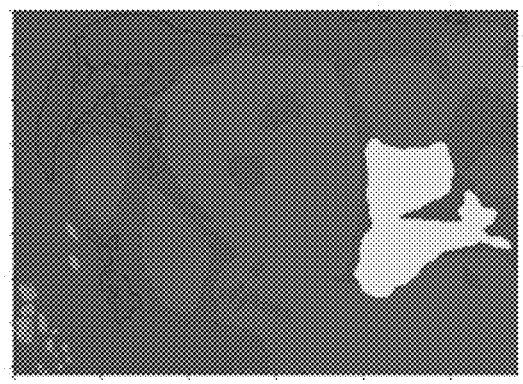

FIG. 7B shows the region-specific labels for the image. Notably, the region-specific labels can be selected from amongst a larger set of labels. In the depicted instance, the yellow region is associated a necrosis label, and the gray regions are assigned a glandular-tissue regions. No corresponding labels are made available in a set of potential object-specific labels availed to the neural network. The necrosis label was omitted as a result of high heterogeneity of spatial characteristics across cells, and the glandular-tissue label was omitted as a result of these regions/cells being rare.

Figure 7C:
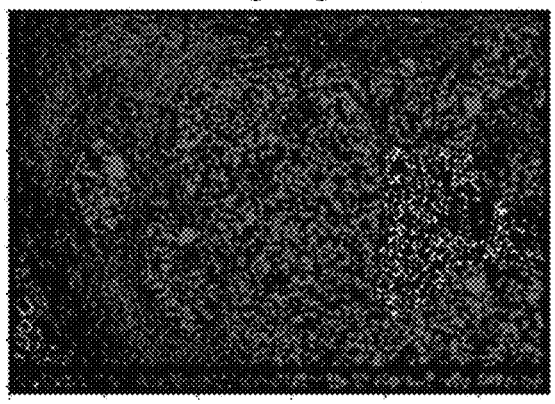

A rule set can then be applied to the output of the neural network to identify objects for which region-prior labels are to be assigned instead of labels identified by the network. The rule set can include a first rule that specifies a confidence-metric threshold, such that each object-specific label associated with a confidence metric (as output by the neural network) is to be changed to a label of a region corresponding to the object. The rule set can include a second rule that indicates that an object-specific label is to be changed to a label of a corresponding region when pre-identified spatial characteristics of the object (e.g., size and shape) do not sufficiently correspond to those of an assigned label (by at least a pre-identified degree). FIG. 7C shows object-specific labels after application of the rule set. Notably, cells that were within the necrosis and glandular-tissue regions are correctly labeled.

IV.E. Facilitating Review of Select Object-Specific Labels

Figure 8B:
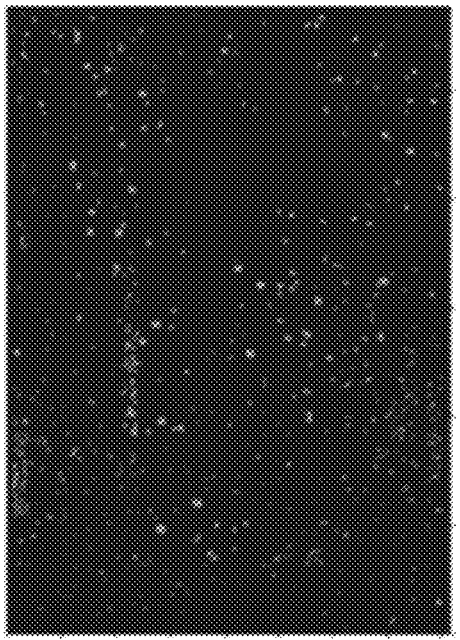
FIGS. 8A-8D show specific metrics used to determine which object-specific labels are to be availed to a reviewer.
Figure 8D:
Figure 8A:
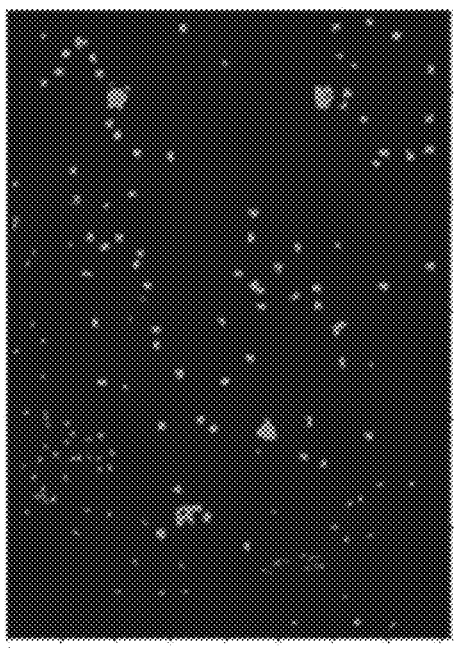
Figure 8C:
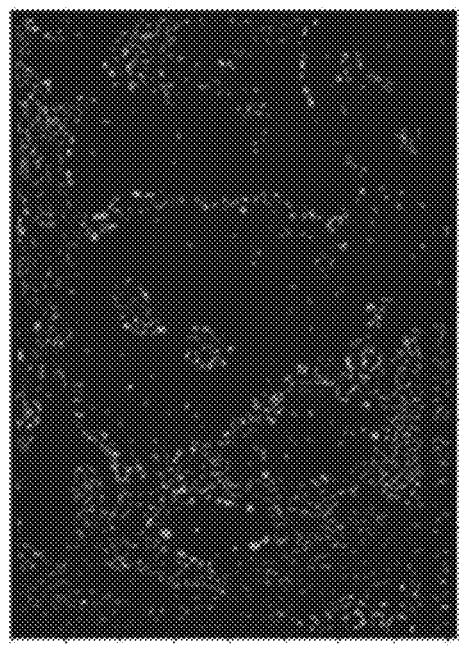

FIGS. 8A-8D show specific metrics used to determine which object-specific labels are to be availed to a reviewer, such that the reviewer can provide input indicating whether an assigned object-specific label is accurate. Specifically, objects may be filtered and/or ranked based on whether they are associated with one or more particular characteristics and/or characteristic values that indicate that a label may be inaccurate. FIG. 8A shows objects that were identified as corresponding to segmentation artifacts. FIG. 8B shows objects that were associated with areas below a predefined threshold or having an unusual shape (e.g., as indicated by an aspect ratio above a predefined threshold). FIG. 8C shows objects that were assigned an object-specific label corresponding to a cell type that physiologically would not be observed within a region type as indicated by a corresponding region-specific label. FIG. 8D shows objects for which object-specific labels were associated with a confidence metric below a predefined threshold.

In some instances, each object may be assigned a score based on a confidence as to whether the object corresponds to a segmentation artifact, a degree to which an area of the object is atypical (e.g., below a size threshold), a degree to which a shape of the object is atypical (e.g., having an aspect ratio above a ratio threshold), whether an object-specific label is inconsistent with a spatially corresponding region-specific label, and a confidence metric. Objects with scores towards an extreme (indicating irregularities) can then be selected for review.

Figure 9A:
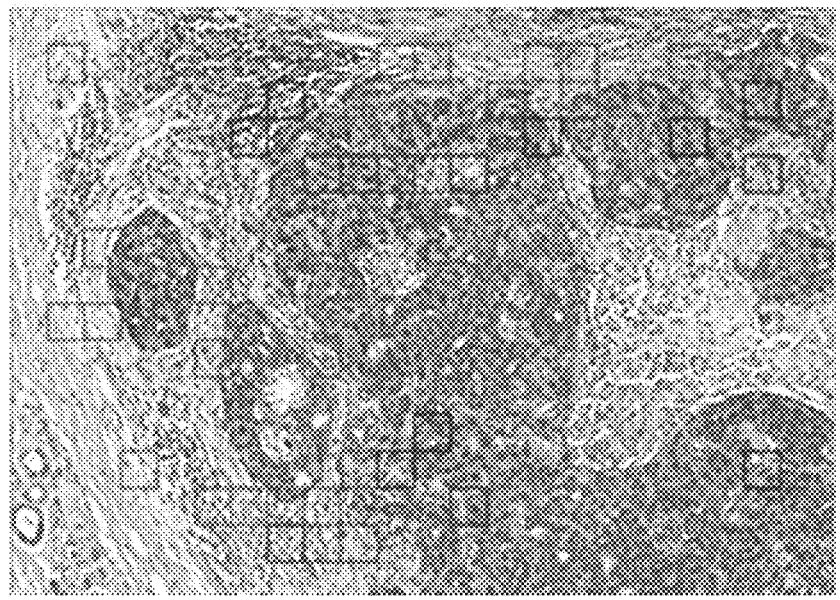
FIGS. 9A-9B illustrate patch selection and representation for review of select object-specific labels.
Figure 9B:
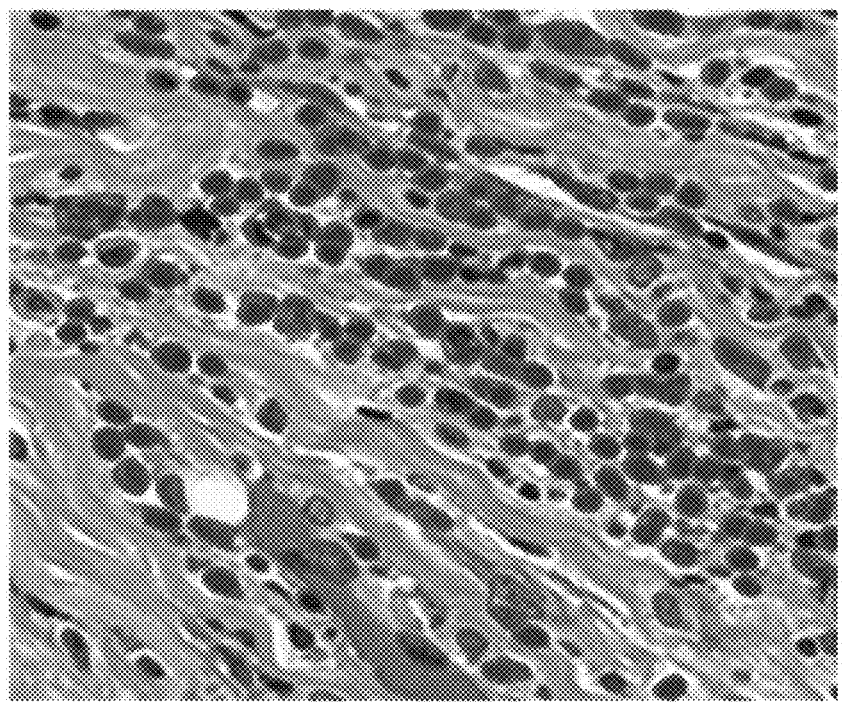

FIG. 9A shows multiple boxed regions within a slide. Each boxed region corresponds to a different field of view. Blue and green boxes correspond to fields of view that are representative of a complete set of fields of view across the slide. Red and purple boxes correspond to fields of view associated with more questionable labels and/or object-specific labels flagged for review. FIG. 9B shows a presentation of a particular field of view that may be presented to the user. Boundaries are drawn around select objects that have been flagged for review. Nucleus segmentation and shading were used to facilitate correction and convey classifier certainty. Segmentation was also used such that when dots are placed for correction, it becomes unambiguous as to which object is being corrected.

V. Process for Using Machine Learning to Label Objects in Images

Figure 10:
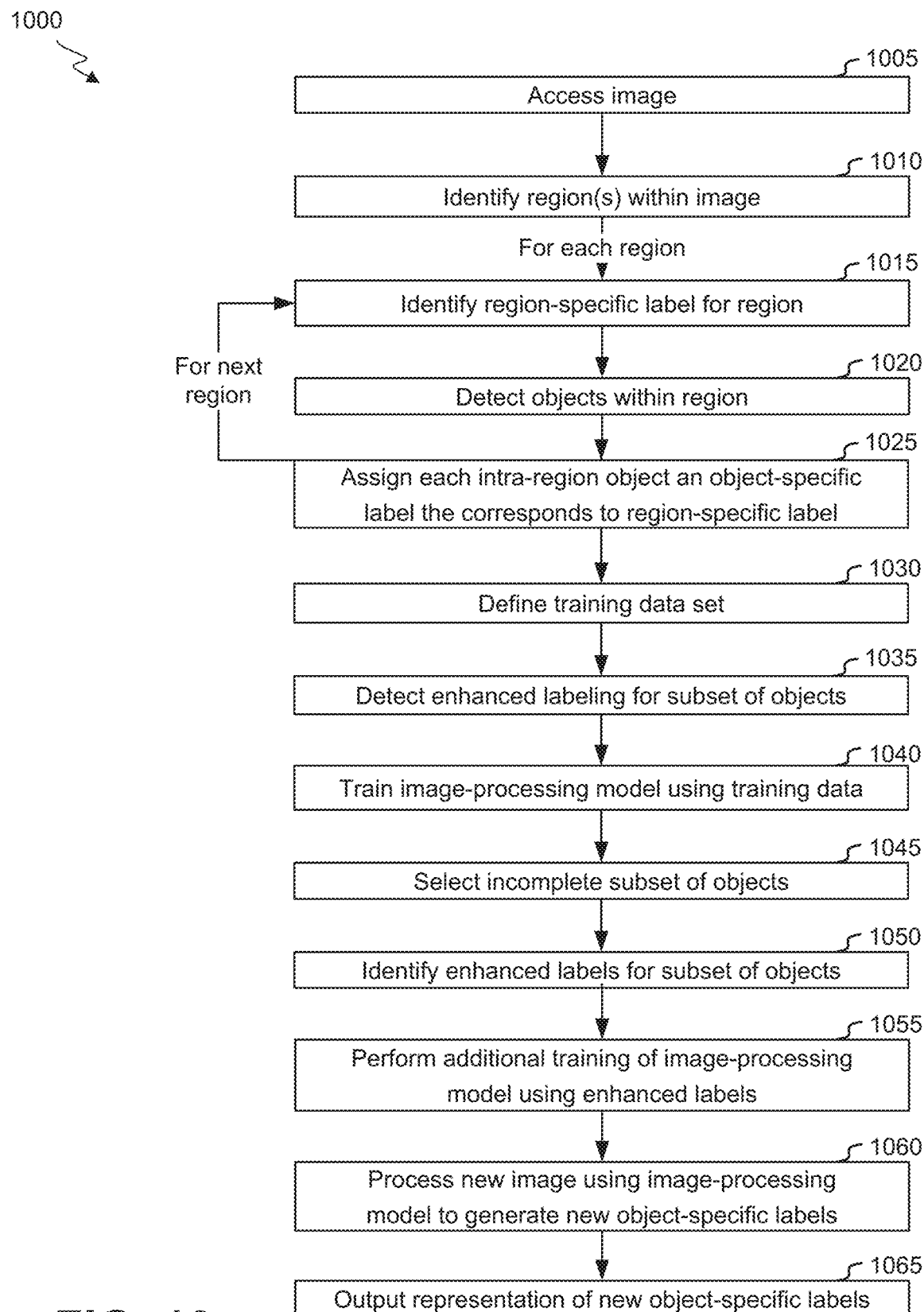
FIG. 10 shows a process for using machine learning to assign labels to objects in an image.

FIG. 10 shows a process for using machine learning to assign labels to objects in an image. Process 1000 begins at block 1005 where an image is accessed. The image can correspond to and/or depict a histology slide. In some instances, a set of patches are used to define portions of the images, which may be independently processed to detect and characterize objects (e.g., in which case, blocks 1010-1025 may be performed for each patch).

At block 1010, regions within the image are identified. The regions may be defined based on user input that may identify boundaries of regions. The regions may alternatively or additionally be defined based on a segmentation analysis.

Blocks 1015-1025 can be applied for each of the identified region. At block 1015, a region-specific label is identified for each region. The region-specific label may be identified based on user input that identifies the label and/or based on a computer-vision categorization approach.

At block 1020, objects within the region are identified. The objects can be identified using a computer-vision and/or segmentation analysis. The identified objects can include a set of cells.

At block 1025, an object-specific label is assigned to each object. At this block, the label that is assigned to the object is defined to be the same label assigned to the region that encompasses the object. Thus, subsequent to this block, all objects within a given region are assigned a same label.

At block 1030, a training data set is defined to include some or all of the object-specific labels. At block 1035, enhanced labeling is defined for a subset of the objects within the training data set. Block 1035 can include changing select object-specific labels to an "other" category that is not to be used during training. The select object-specific labels can correspond to objects having characteristics (e.g., a shape and/or size) indicative of a particular cell state that challenges labeling (e.g., necrosis), the select object-specific labels can be non-physiological in a given context (e.g., in view of other object-specific labels in a region and/or a region-specific label).

At block 1040, an image-processing model can be trained using the training data. The image-processing model can include a deep neural network. The image-processing model can be configured to receive an image and object specifications (e.g., indicating where objects are within the image) and to output a label for each object.

At block 1045, an incomplete subset of the objects can be selected for review. The subset can include a representative sample and/or a sample for which label assignments are associated with lower confidence metrics.

At block 1050, an enhanced label can be identified for each of at least some of the subset of objects. The enhanced label can include a label identified by a reviewer. The enhanced label may be different than an object-specific label initially assigned to the object. In some instances, the enhanced label is the same as the object-specific label initially assigned to the object (though it may have since been confirmed as being accurate by a reviewer).

At block 1055, additional training of the image-processing model can be performed using the enhanced labels. The new image may be processed to detect individual objects. At block 1060, a new image is processed using the image-processing model to generate new object-specific labels. At block 1065, a representation of the new object-specific labels is output (e.g., transmitted or presented). The representation may include the image with one or more overlays that identify detected objects and/or that indicate particular labels assigned to the objects. The representation may additionally or alternatively include higher level data based on the new object-specific labels. The higher level data may identify a count of objects having each of multiple labels, a proportion of objects having each of multiple labels, spatial distributions of labels, etc. Thus, process 1000 facilitates generating accurate object-specific image annotation by using bootstrapped labeling and machine-learning techniques.

VI. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the present description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The invention claimed is:

1. A computer-implemented method comprising:
accessing a set of images;
for each image of the set of images:
    identifying multiple regions within the image, wherein each region of the multiple regions corresponds to an area of the image in which cells depicted within the area of the image have similar visual characteristics;
    for each respective region of the multiple regions:
        identifying a region-specific label for the respective region, wherein the region-specific label indicates a particular cell type for cells in an area of the image associated with the respective region;
        detecting a set of objects within the respective region; and
        assigning, to each respective object of the set of objects, an object-specific label to the respective object, the object-specific label being the same as the region-specific label for the respective region;
    defining a training data set to include, for each image of the set of images:
        object-location data that indicates, for each object of the set of objects, intra-image location data for the object; and
        label data that indicates, for each object of the set of objects, the object-specific label assigned to the object; and
    training an image-processing model using the training data, wherein the training includes learning a set of parameter values for a set of parameters that define calculations performed by the image-processing model.

2. The method of claim 1, further comprising:
selecting, for an image of the set of images, an incomplete subset of the set of objects, the incomplete subset comprising objects in the set of objects identified based on physical characteristics of the objects as requiring reassignment of the object-specific label;
facilitating one or more presentations, each presentation of the one or more presentations including:
    at least part of the image;
    an indication as one or more portions of the at least part of the image that correspond to one or more objects of the incomplete subset of the set of objects and
    for each object of the one or more objects, the object-specific label assigned to the object;
receiving response data that identifies, for each of object of at least some objects of the incomplete subset of the set of objects, a different object-specific label for the object; and
performing additional training of the image-processing model using the different object-specific labels and the set of parameter values, wherein the additional training includes generating a second set of parameter values that includes, for at least some parameters of the set of parameters, a new parameter value different than a corresponding parameter value in the set of parameter values.

3. The method of claim 2, further comprising:
accessing a new image;
processing the new image using the image-processing model configured with the second set of parameter values, wherein a result of the processing includes a particular set of object-specific labels corresponding to a particular set of objects detected in the new image; and
outputting a representation of the particular set of object-specific labels.

4. The method of claim 1, wherein:
each image of the set of images includes a histology image that depicts at least part of a slice of tissue; and
for each object of at least some objects of the set of objects:
    the object corresponds to a cell; and
    the object-specific label corresponds to a cell type.

5. The method of claim 1, wherein the image-processing model includes a deep convolutional neural network.

6. The method of claim 1, further comprising, for each object in the set of objects:
determining one or more characteristics of the object that relate to a size, shape, texture and/or color of the object;
determining whether label-discrepancy condition is satisfied based on the one or more characteristics and stored label-specific characteristic data associated with the object-specific label assigned to the object; and
when it is determined that the label-discrepancy condition is satisfied, updating the object-specific label assigned to the object to a different object-specific label.

7. The method of claim 1, further comprising, for each image of the set of images:
facilitating a presentation of the image;
receiving first user input that defines a set of boundaries in the image, wherein each region of the multiple regions is identified as corresponding to an area within a boundary of the set of boundaries; and
receiving second user input that identifies a set of classifications, wherein each region-specific label is identified based on a classification of the set of classifications.

8. A system comprising:
one or more data processors; and
a non-transitory computer readable storage medium containing instructions which, when executed on the one or more data processors, cause the one or more data processors to perform a set of actions including:
    accessing a set of images;
    for each image of the set of images:

identifying multiple regions within the image, wherein each region of the multiple regions corresponds to an area of the image in which cells depicted within the area of the image have similar visual characteristics;

for each respective region of the multiple regions:
identifying a region-specific label for the respective region, wherein the region-specific label indicates a particular cell type for cells in an area of the image associated with the respective region;
detecting a set of objects within the respective region; and
assigning, to each respective object of the set of objects, an object-specific label to the respective object, the object-specific label being the same as the region-specific label for the respective region;

defining a training data set to include, for each image of the set of images:
object-location data that indicates, for each object of the set of objects, intra-image location data for the object; and
label data that indicates, for each object of the set of objects, the object-specific label assigned to the object; and training an image-processing model using the training data, wherein the training includes learning a set of parameter values for a set of parameters that define calculations performed by the image-processing model.

9. The system of claim 8, wherein the set of actions further include:
selecting, for an image of the set of images, an incomplete subset of the set of objects, the incomplete subset comprising objects in the set of objects identified based on physical characteristics of the objects as requiring reassignment of the object-specific label;
facilitating one or more presentations, each presentation of the one or more presentations including:
at least part of the image;
an indication as one or more portions of the at least part of the image that correspond to one or more objects of the incomplete subset of the set of objects and for each object of the one or more objects, the object-specific label assigned to the object;
receiving response data that identifies, for each of object of at least some objects of the incomplete subset of the set of objects, a different object-specific label for the object; and
performing additional training of the image-processing model using the different object-specific labels and the set of parameter values, wherein the additional training includes generating a second set of parameter values that includes, for at least some parameters of the set of parameters, a new parameter value different than a corresponding parameter value in the set of parameter values.

10. The system of claim 9, wherein the set of actions further include:
accessing a new image;
processing the new image using the image-processing model configured with the second set of parameter values, wherein a result of the processing includes a particular set of object-specific labels corresponding to a particular set of objects detected in the new image; and
outputting a representation of the particular set of object-specific labels.

11. The system of claim 8, wherein:
each image of the set of images includes a histology image that depicts at least part of a slice of tissue; and
for each object of at least some objects of the set of objects:
the object corresponds to a cell; and
the object-specific label corresponds to a cell type.

12. The system of claim 8, wherein the image-processing model includes a deep convolutional neural network.

13. The system of claim 8, wherein the set of actions further include, for each object in the set of objects:
determining one or more characteristics of the object that relate to a size, shape, texture and/or color of the object;
determining whether label-discrepancy condition is satisfied based on the one or more characteristics and stored label-specific characteristic data associated with the object-specific label assigned to the object; and
when it is determined that the label-discrepancy condition is satisfied, updating the object-specific label assigned to the object to a different object-specific label.

14. The system of claim 8, wherein the set of actions further include, for each image of the set of images:
facilitating a presentation of the image;
receiving first user input that defines a set of boundaries in the image, wherein each region of the multiple regions is identified as corresponding to an area within a boundary of the set of boundaries; and
receiving second user input that identifies a set of classifications, wherein each region-specific label is identified based on a classification of the set of classifications.

15. A computer-program product tangibly embodied in a non-transitory machine-readable storage medium, including instructions configured to cause one or more data processors to perform a set of actions including:
accessing a set of images;
for each image of the set of images:
identifying multiple regions within the image, wherein each region of the multiple regions corresponds to an area of the image in which cells depicted within the area of the image have similar visual characteristics;
for each respective region of the multiple regions:
identifying a region-specific label for the respective region, wherein the region-specific label indicates a particular cell type for cells in an area of the image associated with the respective region;
detecting a set of objects within the respective region; and
assigning, to each respective object of the set of objects, an object-specific label to the respective object, the object-specific label being the same as the region-specific label for the respective region;
defining a training data set to include, for each image of the set of images:
object-location data that indicates, for each object of the set of objects, intra-image location data for the object; and
label data that indicates, for each object of the set of objects, the object-specific label assigned to the object; and
training an image-processing model using the training data, wherein the training includes learning a set of parameter values for a set of parameters that define calculations performed by the image-processing model.

16. The computer-program product of claim 15, further comprising:
  selecting, for an image of the set of images, an incomplete subset of the set of objects, the incomplete subset comprising objects in the set of objects identified based on physical characteristics of the objects as requiring reassignment of the object-specific label;
  facilitating one or more presentations, each presentation of the one or more presentations including:
    at least part of the image;
    an indication as one or more portions of the at least part of the image that correspond to one or more objects of the incomplete subset of the set of objects and
    for each object of the one or more objects, the object-specific label assigned to the object;
  receiving response data that identifies, for each of object of at least some objects of the incomplete subset of the set of objects, a different object-specific label for the object; and
  performing additional training of the image-processing model using the different object-specific labels and the set of parameter values, wherein the additional training includes generating a second set of parameter values that includes, for at least some parameters of the set of parameters, a new parameter value different than a corresponding parameter value in the set of parameter values.

17. The computer-program product of claim 16, further comprising:
  accessing a new image;
  processing the new image using the image-processing model configured with the second set of parameter values, wherein a result of the processing includes a particular set of object-specific labels corresponding to a particular set of objects detected in the new image; and
  outputting a representation of the particular set of object-specific labels.

18. The computer-program product of claim 15, wherein:
  each image of the set of images includes a histology image that depicts at least part of a slice of tissue; and
  for each object of at least some objects of the set of objects:
    the object corresponds to a cell; and
    the object-specific label corresponds to a cell type.

19. The computer-program product of claim 15, wherein the image-processing model includes a deep convolutional neural network.

20. The computer-program product of claim 15, further comprising, for each object in the set of objects:
  determining one or more characteristics of the object that relate to a size, shape, texture and/or color of the object;
  determining whether label-discrepancy condition is satisfied based on the one or more characteristics and stored label-specific characteristic data associated with the object-specific label assigned to the object; and
  when it is determined that the label-discrepancy condition is satisfied, updating the object-specific label assigned to the object to a different object-specific label.

* * * * *